United States Patent
Ylösjoki

[11] Patent Number: 5,171,690
[45] Date of Patent: Dec. 15, 1992

[54] COMPOSTING DEVICE FOR TOILET AND KITCHEN WASTE

[76] Inventor: Matti J. Ylösjoki, Estetie 3, SF-00430 Helsinki, Finland

[21] Appl. No.: 655,388
[22] PCT Filed: Aug. 31, 1989
[86] PCT No.: PCT/FI89/00163
  § 371 Date: Feb. 12, 1991
  § 102(e) Date: Feb. 12, 1991
[87] PCT Pub. No.: WO90/02720
  PCT Pub. Date: Mar. 22, 1990

[30] Foreign Application Priority Data

Sep. 1, 1988 [FI] Finland .................. 884023

[51] Int. Cl.⁵ .............................................. B01J 8/00
[52] U.S. Cl. ........................................ 435/312; 4/253; 4/300; 4/DIG. 12; 71/12; 71/13; 435/287; 435/311
[58] Field of Search ............ 422/184; 71/12, 13; 435/287, 311, 312; 4/253, 300, DIG. 12

[56] References Cited

U.S. PATENT DOCUMENTS

| | | | |
|---|---|---|---|
| 2,898,198 | 8/1959 | Robedee | 422/184 |
| 3,840,907 | 10/1974 | Syndberg | 4/DIG. 12 |
| 3,916,456 | 11/1975 | Perrson | 4/DIG. 12 |
| 4,087,869 | 5/1978 | Billsund | 4/DIG. 12 |
| 4,096,592 | 6/1978 | Clark | 4/DIG. 12 |
| 4,254,515 | 3/1981 | Kiyama et al. | 4/DIG. 12 |
| 4,313,234 | 2/1982 | Stewart | 4/DIG. 12 |
| 4,894,872 | 1/1990 | Anderson, Jr. et al. | 4/DIG. 12 |

FOREIGN PATENT DOCUMENTS

| | | |
|---|---|---|
| 2345241 | 3/1973 | Fed. Rep. of Germany . |
| 2705720 | 8/1978 | Fed. Rep. of Germany . |
| 384017 | 10/1979 | Sweden . |
| 434314 | 10/1967 | Switzerland . |

Primary Examiner—Robert J. Warden
Assistant Examiner—Timothy M. McMahon
Attorney, Agent, or Firm—Ladas & Parry

[57] ABSTRACT

The invention relates to a composting device for toilet and foodstuff waste to be used in connection with a toilet. In the device according to the invention, the upper portion of a rotating compost container 6 provided with a filtering floor 9 is divided into four sections to keep apart compost materials of different degree of composting. The compost container is positioned partialy within the toilet room so that the toilet seat 5 is positioned immediately or substantially immediately above the cover of the composting device. In this way, the natural aeration will not cause the smell of the compost material to enter the toilet room when the cover of the toilet is opened. In the composite container, the waste is aerated both from above and from below. The circulation of air is arranged to take place naturally so that it flows all the time upwards. The air flow causes the liquid 10 on the bottom of the container to evaporate and takes the evaporated liquid with it, thus keeping the above composte material humid. Surplus liquid is discharged from the central area of the bottom of the compost container. This enables the collection of liquid at one point by means of a single-wall rotating container.

6 Claims, 2 Drawing Sheets

COMPOSTING DEVICE FOR TOILET AND KITCHEN WASTE

The invention relates to a composting device for toilet and kitchen waste, which device is to be used in connection with a toilet. In normal use, the toilet and kitchen waste is removed from the device after it has been composted into soil.

In composting toilets, it is a common practice to add additives to the waste contained in a one-part composting container in connection with the filling of the container. These additives make the composting more rapid and alleviate the smell problem. The compost is usually aerated only at the top, and the surplus liquid remaining after the aeration is discharged directly into the surroundings through small openings formed in the bottom or at the side of the bottom or through a collector pipe. When the composting device is emptied, waste materials composted to different degrees are mixed with each other, whereby fresh, smelling waste is also removed from the container in connection with the emptying. The compost cannot be used as plant manure without intermediate storage.

There also exists a rotating composting device in which a cylindrical inner compost container is positioned within a cylindrical outer container. The compost container is divided into four sections in such a manner that waste materials composted to different degrees remain apart from each other. The composting device is positioned below the floor of the toilet room, and a vertical tube projects from it into the toilet room. The toilet seat is positioned at the end of the tube. In this composting device, the waste is aerated only from the top. Surplus liquid flows into the outer container through small openings provided in the bottom of the compost container, where from it is discharged through a discharge tube provided at the side of the container. Only the inner container rotates on a shaft positioned centrally in the container.

A common problem with the first-mentioned composting devices is that wastes of different degree of composting are mixed with each other in connection with the emptying and/or the composting process is postponed by means of additives so that it takes place after the emptying. The compost to be emptied smells and cannot be used as manure as such.

In the last-mentioned composting device, the composting of waste takes place slowly, as only the top layer of the compact waste material is aerated. Also, the waste is too dry as it does not get any extra humidity when the aeration air flows on the top of the waste layer into the liquid container and out therefrom. Due to the elongated vertical tube with the toilet seat at the top of it, the smell of the compost enters the toilet room as the natural aeration is not strong enough to suck the smell down along the rather long tube. The double container makes the composting device expensive and the container is difficult to empty from the side through a door provided in the double container wall. The compost material easily flows into a gap defined between the containers when the container is being emptied, which later on hampers the discharge of liquid.

A decisive improvement is achieved with respect to the above drawbacks by means of a device according to the invention.

In the device according to the invention, a rotating compost container is divided into four sections to keep apart compost materials of different degree of composting. After one section has been filled up, the waste contained therein is covered with a couple of buckets of soil or old compost, and the container is rotated to take a new container section into use. The compost container is positioned partly within the toilet room so that the toilet seat is positioned immediately or substantially immediately above the cover of the composting device. In this way, no vertical tube difficult to aerate is needed and, as a consequence, the smell of the compost will not enter the inner room when the lid of the toilet seat is opened.

In the compost container, the waste is aerated both from above and from below as the container is provided with a grate and a floor made of a filtering cloth. The circulation of air is arranged to take place in such a manner that the air flow is all the time natural, that is, takes place in an upward direction (the air warms up in the composting device). The air flow causes the liquid on the bottom of the container to evaporate and takes the evaporated liquid with it, thus continuously introducing liquid into the compost material above so that the compost will not get dry. Partition walls provided in the container make the air flow flush the compost material efficiently both from below and from the top. The aeration and humidification are made even more efficient as part of the air flow passes through the compost material.

All of the compost liquid stays for some time in a receiver formed in the bottom of the container, being purified biologically. Thereafter part of the liquid is evaporated and part of it flows away through an opening provided centrally in the bottom of the compost container into a receiver therebelow. In this way, the liquid can be collected at one point by means of a rotating single-wall container, and the high cost of a double container construction is avoided.

The composting device is emptied from the outside by lifting the emptying door. Since there is no gaps between container walls, the compost material will not clog liquid discharge openings when emptied.

By means of the device according to the invention, a decisive improvement is achieved with respect to the above drawbacks.

A major advantage of the invention is that the composting device is improved to such an extent that even in a device based on natural aeration, the compost material to be emptied is already in the form of good manure. Furthermore, the smell problems of the composting device are alleviated, and the cost of manufacture is reduced.

Practical experiments and laboratory tests carried on a prototype of the invention have shown that the invention works well and efficiently as described above.

BRIEF DESCRIPTION OF THE DRAWINGS

In the following the invention will be described in detail with reference to the attached drawings, wherein

FIG. 1 shows a composting toilet device according to the invention when installed in place in the wall of a building. A compost container 6 is positioned partly outside the building, partly within it in such a manner that a toilet seat 5 is positioned within the building and a ventilation tube 13 as well as an emptying lid 2 outside the building.

Figure 1:
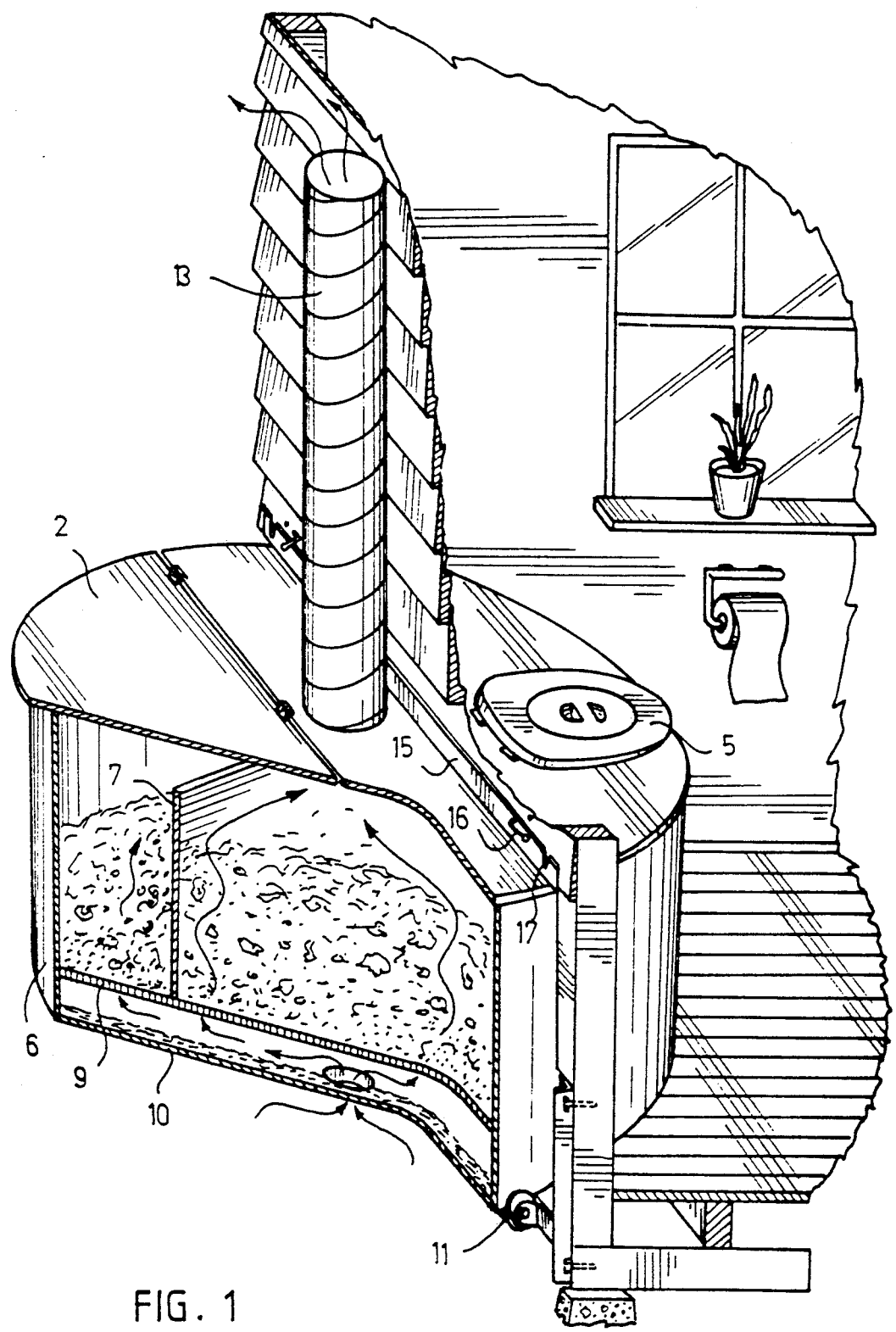
FIG. 1 shows a composting device when installed in place.

Partition plates 7 are provided within the container 6 so as to divide the container into compartments. In use, a bed of compost liquid 10 is gathered on the bottom of the container while the proper compost material is gathered on a filtering floor 9. The container 6 rotates on wheels 11.

Figure 2:
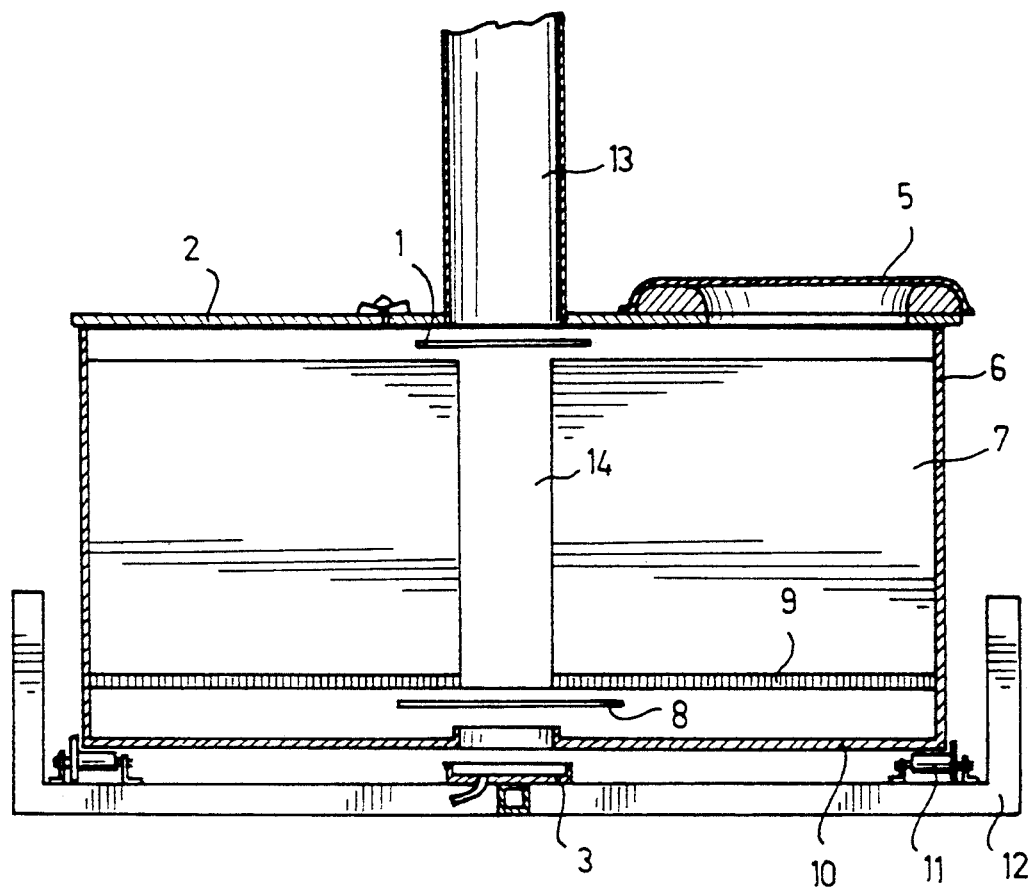
FIG. 2 shows a general cross-sectional view of the device of the invention.

FIG. 2 shows a general cross-sectional view of the device of the invention. Air enters the composting device through a gap defined between a receiver hopper 3 for surplus liquid and the container 6. The air passes around a lower plate 8, entraining liquid from the underside and humidifying and oxidizing the compost material on the filtering floor 9 from below. The air passes on in a centrally positioned rising tube 14 below an upper plate 1 which leads the humid air on top of the compost material and further into the ventilation tube through a gap defined between the upper plate 1 and the ventilation tube and then out of the device. Part of the air passes upwards through the compost material.

The device according to the invention can also be provided with mechanical ventilation or heating, or additives promoting composting can be used.

The diameter of the lower plate 8 and the upper plate 1 is preferably 1.5 to 3 times greater than that of the rising tube. The cover of the container 6 is detachable so that it can be lifted on hooks 16 fastened to the wall while the container is rotated. Normally the cover of the container 6 is fastened in place by means of a supporting iron 15 and screws 17 provided at both ends thereof. In order to avoid the construction of a separate basement for the device, the device comprises a supporting framework 12 for fastening it to the walls of the building on both sides and to the floor of the toilet room in front of the toilet seat. As distinct from the above, the device can be positioned entirely within the building.

In the device according to the invention, it is, of course, possible to use any suitable filtering layer in place of the filter cloth, and various other air flow guide means can be used in place of the upper and lower partition plates. It is likewise thinkable that no separate air flow guide means are required if the composting device is so designed that the air flows as described above.

I claim:

1. A device for composting toilet and foodstuff waste in connection with a toilet, comprising a single outer wall rotating container provided with a filtering floor positioned above a bottom portion of the container, the portion of the container above the floor being divided by means of vertical walls into sections, an opening surrounded with upwardly lifted edges being formed centrally in the bottom portion of the container, whereby a liquid bed remains on the bottom portion of the container, a rising tube for leading the air flow partly past the compost material so that the humid air flow is able to rise up to the top of the compost material, and air flow guide means for guiding the air flow within the container to the lower and upper surface of the compost material, whereby the ventilation air flowing from the bottom portion of the container to a top portion of the container entrains with it liquid from the liquid bed humidifying the compost material from below, and then flows through the compost material, and humidifies it from the top, wherein said air flow guide means including a lower partition means arranged at the lower end of the rising tube and an upper partition means arranged at the upper end of the rising tube, the partition means being positioned above the liquid bed.

2. A device according to claim 1, wherein a cover of the container is detachable so as to be lifted on hooks fastened to a wall of a building while the container is rotated.

3. A device according to claim 1, wherein a cover of the container is kept in place by means of a support iron and screws positioned in vertical screw grooves at both ends of the iron.

4. A device according to claim 1, further comprising a support framework for fastening the device to a wall of a building and to the floor of a toilet room in front of a toilet seat.

5. A device according to claim 1, wherein said lower partition means comprises a plate and wherein said upper partition means comprises another plate.

6. A device according to claim 5, wherein the diameter of the partition plates is 1.5 to 3 times greater than that of the rising tube.

* * * * *